Patented Dec. 22, 1936

2,064,866

UNITED STATES PATENT OFFICE 2,064,866

LACQUERING PROCESSES

Watson H. Woodford, Bridgeport, Conn., assignor to Remington Arms Company, Inc., a corporation of Delaware No Drawing. Application May 23, 1934, Serial No. 727,152

8 Claims.   (Cl. 91—68)

The present invention relates to a method of preparing surfaces for the application of a coat of a quick drying lacquer or varnish, and particularly to the preparation for such lacquering of surfaces which are coated or contaminated with a wax, grease or oil. The invention will be described with reference to the preparation of paraffin impregnated paper shot shell bodies for lacquering, although it will be understood that its utility is not limited to this particular field.

It is well known that the application of a quick drying lacquer or varnish to a waxy surface is extremely difficult. Such lacquers or varnishes contain volatile fluid ingredients which have a solvent action on waxes, particularly paraffin. Due to the solution of paraffin in such solvents, the lacquer becomes contaminated in such a way that its drying time is greatly retarded and, even when dried as much as possible, it does not form a hard uniform lacquer coating. In paper shot shell bodies paraffin or other wax or oil has important functions. However, its waterproofing properties are inadequate, so that it becomes desirable to apply a coat of a quick drying lacquer or varnish to the paraffin impregnated body. In the past, various methods for accomplishing this have been proposed. In applicant's Patent No. 1,733,177 there is disclosed a method of sealing in the paraffin by the application of a composition which is essentially a solution of ester resin and acetone. Applicant's co-pending application, Serial No. 381,402, discloses a lacquer including a metallic soap, it having been found that the presence of a metallic soap in a substantial measure prevents the solution of paraffin in the lacquer solvent. Other methods contemplate removing substantially all of the surface paraffin by heating and abrasion.

The present invention comprises the discovery of a method of preparing the surface of a wax impregnated article for the reception of a lacquer coating, which method is believed to be wholly novel. Wax still remains present on the surface but is apparently rendered inactive, permitting the application of a wide variety of quick drying lacquers. Shot shells or other articles freshly made and comprising wax impregnated bodies with a film of wax at the surface are dipped for a brief interval into a wax solvent, preferably heated. Among such solvents are the coal tar hydrocarbons, such as benzene, toluene and xylene; the petroleum hydrocarbons, such as benzine; and, chlorine derivatives, such as carbon tetrachloride, dichlorethylene, and trichlorethylene. The preferred solvent is toluene, heated to about 150° F. The time which the articles remain in the solvent is not sufficient to dissolve all of the surface wax, being of the order of two seconds. The articles are then removed from the solvent, remain in the air for a brief interval, and while still moist are dipped in a fluid in which the wax is not readily soluble, such as methyl alcohol, ethyl alcohol, or acetone. The non-solvent is preferably cold, and the articles remain therein for but a brief interval, usually about two seconds. Upon removal from the non-solvent, the articles will completely dry in the air in one or two minutes, after which they are ready for the application of a coating of a quick drying varnish or lacquer. The lacquer is preferably applied by dipping, and its composition may vary greatly, the necessity for special selection and proportioning of unusual resins, plasticizers and solvents, being largely obviated. A suitable lacquer dries on articles thus prepared in six to eight minutes with an adherent, smooth, continuous and elastic coating, entirely free from wax, and the process can be practiced continuously, dipping articles in the same lacquer container and making the necessary replacement of lacquer, without any appreciable contamination of the lacquer by wax. Small quantities of wax accumulating in the toluene and the alcohol can be readily removed by distillation.

A peculiar aspect of the process is that surfaces which have been dipped first in toluene or a similar solvent and subsequently in alcohol or a similar non-solvent are still more or less coated with wax which can be dissolved off and accumulated by the use of suitable solvents. Thus, the process does not result in such a removal of wax as leaves a dry or wax-free surface; instead, the surface wax apparently undergoes some reaction or change which prevents or retards its solution in the lacquer solvent to such an extent that a perfect adhesion of the lacquer is secured without any wax reaching the surface of the film to destroy the lacquer surface or prevent drying.

Applicant's best explanation of the results achieved by this process is as follows: When the articles are removed from the toluene or other wax solvent the surface is covered with a moist layer of a mixture of wax and solvent. Before the solvent has had time to evaporate, the article is dipped in a fluid which, while it does not dissolve wax, is miscible with the solvent. The mixture of wax and solvent thereupon diffuses into the non-solvent, due to the miscibility of the solvent and non-solvent, the effect possibly being augmented by the greater density of the solvent.

It is to be understood, however, that applicant is not limited by the foregoing theory, and that the process being broadly new and of wide applicability, the appended claims are to be broadly construed.

What is claimed is:

1. The method of finishing paraffin impregnated shot shell bodies which comprises dipping in toluene, withdrawing from the toluene, dipping while still moist in alcohol, drying, and applying a lacquer.

2. The method of preparing a waxy surface for coating with a lacquer containing a wax solvent, which comprises applying toluene to said surface and while the surface is still moist applying alcohol thereto.

3. In the finishing of wax impregnated articles, the method of securing a hard, continuous, adherent lacquer film, which comprises washing with toluene and subsequently rinsing with alcohol, evaporating the excess alcohol, and applying a lacquer.

4. In the finishing of wax impregnated articles, the method of securing a hard, continuous, adherent lacquer surface, which comprises first applying a wax solvent and while the surface is still moist applying a wax non-solvent which is miscible with the wax solvent, drying, and applying a lacquer.

5. The method of securing a hard, continuous, impervious lacquer film on a surface contaminated with wax, which comprises washing with toluene, rinsing with alcohol while the surface is still moist, drying, and applying a lacquer.

6. The method of preparing a wax impregnated article for receiving a lacquer coat, which comprises dipping said article in a wax solvent and while the surface is still moist dipping said article in a wax non-solvent which is miscible with the wax solvent.

7. The method of preparing a wax impregnated article for receiving a lacquer coat, which comprises dipping said article in a wax solvent selected from the group consisting of benzene, toluene, xylene, benzine, carbon tetrachloride, dichlorethylene and trichlorethylene, and while still moist dipping in a wax non-solvent which is miscible with the wax solvent.

8. The method of preparing a wax impregnated article for receiving a lacquer coat, which comprises dipping said article in a wax solvent selected from the group consisting of benzene, toluene, xylene, benzine, carbon tetrachloride, dichlorethylene and trichlorethylene, and subsequently dipping while still moist in a wax non-solvent selected from the group consisting of ethyl alcohol, methyl alcohol and acetone.

WATSON H. WOODFORD.